United States Patent [19]
Leonhardt et al.

[11] Patent Number: 5,850,328
[45] Date of Patent: Dec. 15, 1998

[54] MEDIA FOR RECORDING DATA ON TWO SIDES OF A MAGNETIC TAPE HAVING ANGULARLY DISPLACED ORIENTATIONS

[75] Inventors: Michael Lawrence Leonhardt, Longmont; Hartvig Edmund Melbye, Boulder, both of Colo.

[73] Assignee: Storage Technology Corporation, Louisville, Colo.

[21] Appl. No.: 969,848

[22] Filed: Nov. 14, 1997

Related U.S. Application Data

[63] Continuation-in-part of Ser. No. 396,692, Mar. 1, 1995, abandoned.

[51] Int. Cl.[6] .................................................. G11B 5/78
[52] U.S. Cl. .................... 360/134; 423/694 BA; 423/694 BM
[58] Field of Search ................... 360/70, 84, 90, 360/93, 95, 107, 130.21, 134; 428/694 BA, 694 BH, 694 BM; 427/548, 128, 48

[56] References Cited

U.S. PATENT DOCUMENTS

| | | | |
|---|---|---|---|
| 5,001,580 | 3/1991 | Aranovsky et al. | 360/77.12 |
| 5,128,815 | 7/1992 | Leonhardt et al. | 360/85 |
| 5,307,217 | 4/1994 | Saliba | 360/121 |
| 5,452,153 | 9/1995 | Baheri et al. | 360/78.05 |
| 5,474,814 | 12/1995 | Komatsu et al. | 427/549 |

*Primary Examiner*—Brian E. Miller
*Attorney, Agent, or Firm*—Duft, Graziano & Forest

[57] ABSTRACT

The two sided magnetic recording tape consists of a standard film substrate to which a coating of magnetic recording materials is applied, on both sides thereof. In order to reduce the effect of magnetic print through and contact recording, the particles or films that are applied to both sides of the substrate are oriented during manufacture in differing magnetic orientations that are angularly displaced with respect to each other, either coplanar or non-coplanar on the recording surface of the magnetic tape.

13 Claims, 7 Drawing Sheets

MEDIA FOR RECORDING DATA ON TWO SIDES OF A MAGNETIC TAPE HAVING ANGULARLY DISPLACED ORIENTATIONS

RELATED APPLICATION

This application is a continuation-in-part of application Ser. No. 08/396,692 filed Mar. 1, 1995, abondoned the disclosure of which is hereby incorporated by reference to the same extent as if fully set forth herein.

FIELD OF THE INVENTION

This invention relates to magnetic recording and, in particular, to media for recording data on both sides of a two sided magnetic tape.

PROBLEM

It is a problem in the data processing industry to store the maximum amount of data on the minimum volume of media. Magnetic recording tape is commonly used as the media of choice since it is inexpensive and yet provides a significant data storage capacity per unit volume. Improvements in magnetic recording technology have increased the track density as well as the linear bit recording density for magnetic tape in order to maximize the number of bits stored per square inch of magnetic tape. In addition, thinner tape substrates have decreased the volume needed to house a given length of tape. Further improvements in the recording density of magnetic tape are increasingly difficult to attain. Higher track densities challenge the ability to accurately locate tracks for writing and reading with any misalignment between a head and the tracks giving rise to data corruption and data losses. Increased linear densities create increased sensitivity to head-media spacing losses resulting in reduced signal to noise ratios leading to reduced data reliability. Higher recording densities increase the susceptibility to data loss from media defects and challenge the read/write error correcting systems to accommodate the data losses. Reductions in media thickness create tape handling challenges and increase the danger of physical damage to the tape.

Two sided magnetic tape has been proposed in the past but has been found to be impractical for a number of reasons. One problem with two sided magnetic tape is the phenomena of print through, wherein data written on the magnetic media located on one side of the magnetic tape effects the magnetization of the magnetic media located on the other side of the magnetic tape. The use of a thicker media reduces the print through phenomena but it also reduces the volumetric storage capacity of the magnetic tape. The phenomena of contact recording can also be a problem. Contact recording can occur when the magnetic tape is wound on a reel. This places the magnetic media of one side of the magnetic tape physically against the magnetic media on the other side of the magnetic tape from a previous wrap of magnetic tape on the reel. When the entire length of a two sided magnetic tape is wound onto the tape reel, the magnetic media of one recording surface is physically juxtaposed to the magnetic media of a second recording surface. The physical contact of the two magnetic medias can cause errant magnetization of the media on either side of the tape. Further, the use of long wavelengths to write data on the magnetic tape augments print through and aggravates contact recording. Therefore, two sided magnetic tape has not been used in the data processing industry since these phenomena cause unacceptable levels of errors in reading and writing data onto this media.

SOLUTION

The above described problems are solved and a technical advance achieved in the field by providing a media for enabling the recording of data on two sides of a magnetic tape. Data is written on both sides of the magnetic recording tape in directions of magnetization that are of sufficient angular displacement to each other to reduce the effects of contact recording and magnetic print through. As subsequently described, this angular displacement is achieved by orienting the recording surfaces on opposing sides of the magnetic tape in directions angularly displaced with respect to each other at the time of manufacture. The media used for this magnetic tape consists of a film substrate to which a coating of magnetic recording material is applied on both sides thereof. In a preferred embodiment, magnetic materials with substantially identical bulk magnetic properties are applied to each side of the tape. The resultant magnetic tape has two recording surfaces, one on each side of the film substrate. Data is written on both the front and the back of this magnetic tape to double the data density of this magnetic tape with respect to conventional one sided magnetic tape media.

In order to reduce the effect of magnetic print through and contact recording, the magnetic particles of magnetic materials on both sides of the substrate are aligned in differing magnetic orientations during the manufacturing process. The magnetic orientation of each side is of sufficient angular displacement with respect to the other side to minimize the effects of contact recording and print through. The orientation of the magnetic particles on each side can be coplanar with the recording surface of the magnetic tape (x and y axis) or perpendicular to the recording surface (z axis) of the magnetic tape or vector combinations thereof. The greater the angular disparity between magnetic orientations (up to the point of being orthogonal) on the two sides of the magnetic recording tape, the lesser the possibility of magnetic print through or contact recording.

The tape drive used to read the two sided magnetic tape can include two sets of read/write heads, with one set of read/write heads being located on each of the two sides of the magnetic tape as it travels through the tape path in the tape drive. In the preferred embodiment, the two sets of read/write heads can comprise identical read/write elements and can use identical recording channels components for reading/writing data to each side of the tape. The difference between the two sets of read/write heads being that each has an azimuth alignment with the tape that allows each set of read/write heads to perform read/write operations on one side of the tape.

The two sets of read/write heads concurrently read/write data on the respective sides of the magnetic tape thereby operating at twice the data transfer rate of a single read/write head tape drive. Alternatively, the data can be written at the data transfer rate of a single read/write head by successively activating the two read/write heads to write data first on one side of the magnetic tape then on the other side of the magnetic tape. To minimize print through and contact recording effect during storage write and/or read operations, each of two sets of read/write heads are aligned to generate read/write magnetic fields on one side of the magnetic tape that are angularly displaced with respect to the generated read/write magnetic fields on the other side of the magnetic tape.

DETAILED DESCRIPTION

In data processing systems, a commonly used data storage media is the magnetic recording tape. A popular industry standard form of this magnetic recording tape is the 3480-type magnetic tape cartridge 302 (FIG. 1) which uses a ½-inch magnetic tape 100 wound on a single reel 303 that is rotatably mounted within the magnetic tape cartridge 302. One end of the magnetic tape 100 is affixed to a leader block 304, which is positioned juxtaposed to an opening 305 in one corner of the magnetic tape cartridge 302 when the tape is rewound on reel 303. Leader block 304 enables a tape threading arm (not shown) in an associated drive element to extract the leader block 304 and the attached magnetic tape 100 from the magnetic tape cartridge 302. The tape threading arm guides the magnetic tape 100 via the leader block 304 through the tape path in the tape drive mechanism to thread the leader block 304 and the end of the magnetic tape 100 onto a drive reel (not shown) contained within the tape drive mechanism.

Two Sided Magnetic Recording Tape

Figure 1:
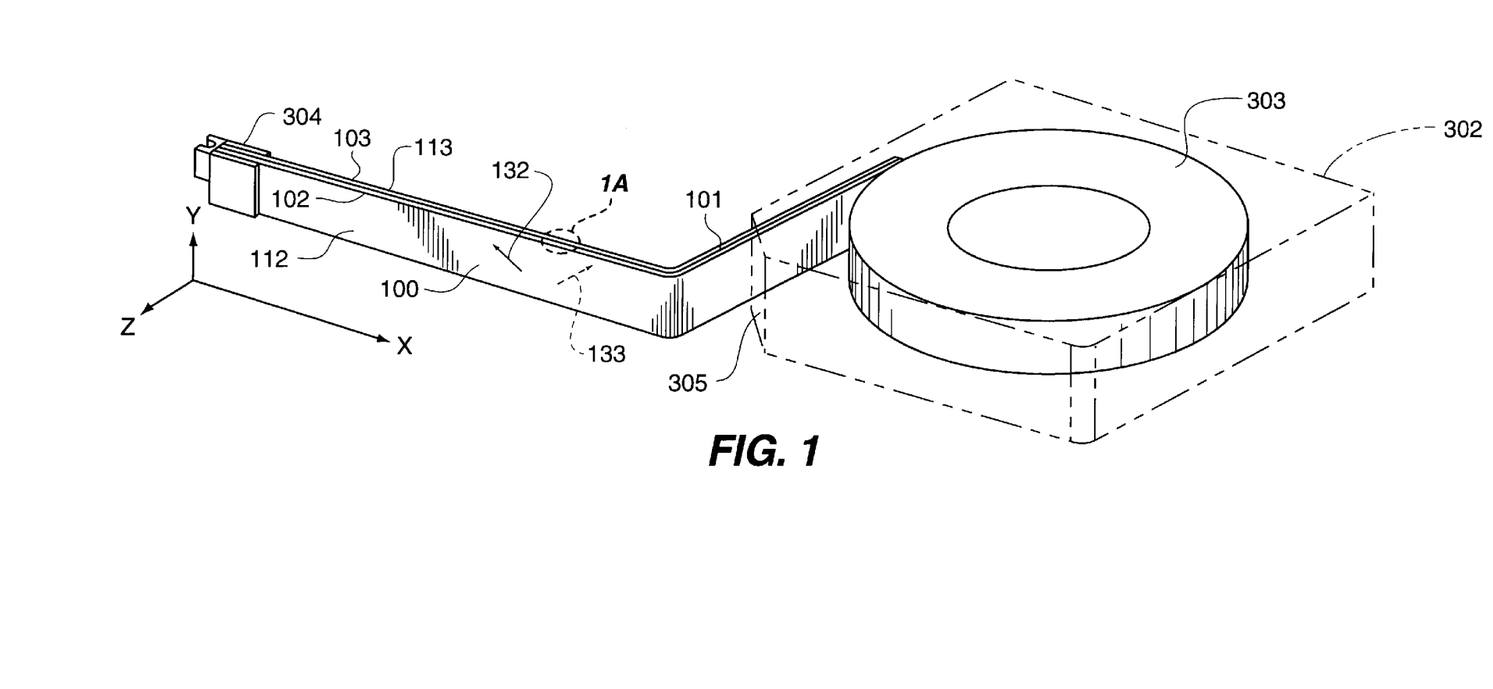
FIG. 1 illustrates a magnetic tape having magnetic orientations in planar directions that are angularly displaced with respect to each other.
Figure 2:
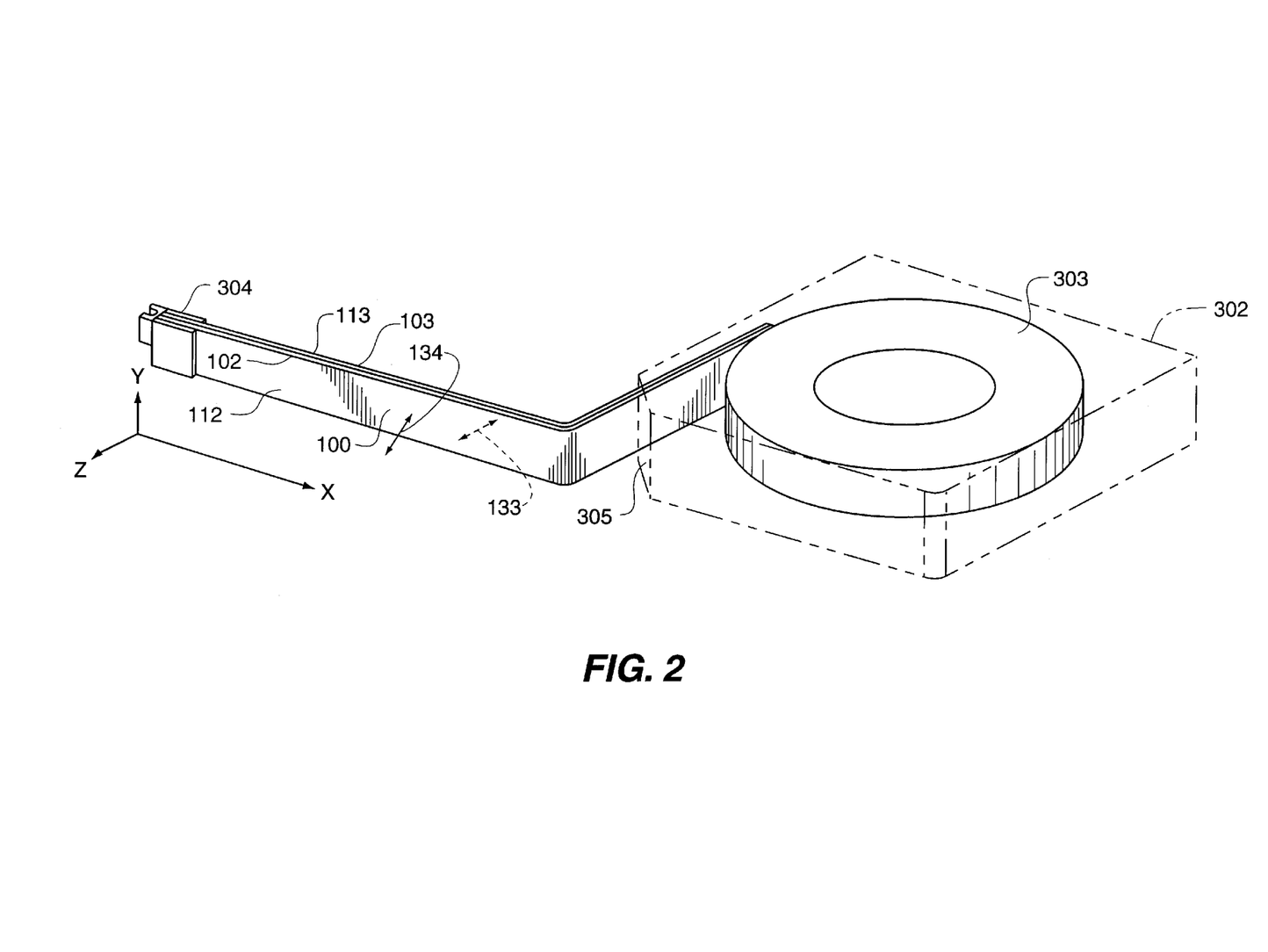
FIG. 2 illustrates a magnetic recording tape having magnetic orientations that are angularly displaced from each other in directions that are perpendicular to the surface of the recording tape on one side of the tape and planar to the surface on the other side of the tape.
Figure 3:
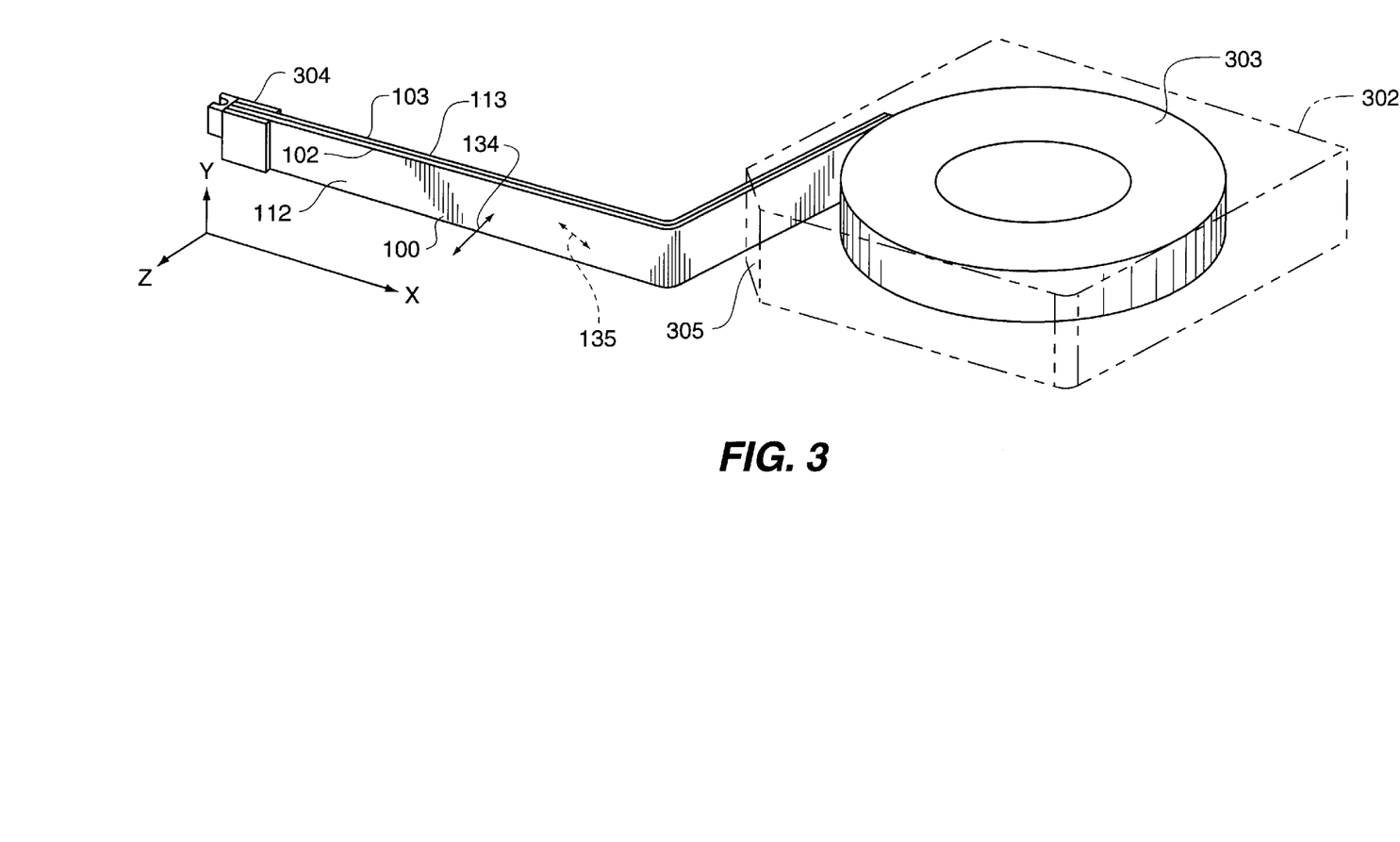
FIG. 3 illustrates a magnetic recording tape having magnetic orientations angularly displaced from each other in directions that are perpendicular to the surface of the tape.

FIGS. 1, 2, and 3 illustrate a perspective view of the two sided magnetic recording tape 100 to illustrate the orientation of the magnetic domains in the magnetic material contained therein. In all of these figures, a set of Cartesian coordinate axes are provided to simplify the description of the magnetic orientation. Magnetic recording tape 100 can consist of a film substrate 101 on which has been deposited two recording surfaces, consisting of a first layer 102 of a magnetic material on a first side 112 of the substrate 101 and a second layer 103 of the magnetic material on a second side 113 of the substrate 101. The magnetic material used in the first layer 102 and the second layer 103 is of a standard composition. In the preferred embodiment, the same type magnetic material is used on each side of the tape. A first magnetic field is applied during the manufacturing process to the magnetic material of first layer 102 to orient the magnetic particles of first layer 102 in first orientation 132. A second magnetic field is applied during the manufacturing process to the magnetic material of second layer 103 to orient the magnetic particles second layer 103 in second orientation 133. First orientation 132 is coplanar with and angularly displaced from second orientation 133.

Figure 1A:
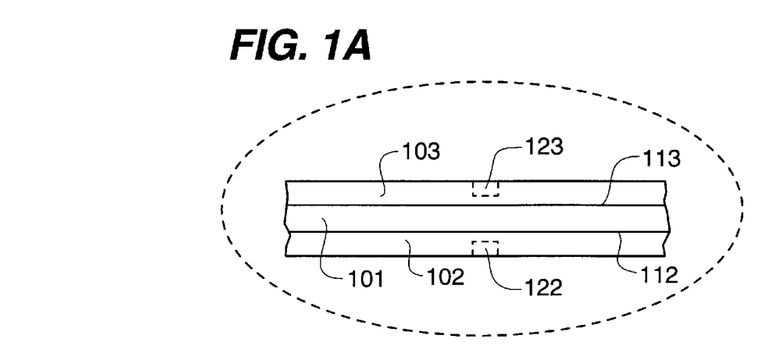
FIG. 1A illustrates a cross sectional view of an edge of a two sided magnetic tape.

FIG. 1A illustrates a cross sectional view of tape 100. During the subsequent write process, the regions of magnetization 122, 123 are formed in magnetic recording tape 100. The magnetic tape 100 is positioned in FIG. 1 such that a plane formed by the x and y axes is coplanar with the recording surfaces of the magnetic recording tape 100 and coincident to a plane through the center of film substrate 101. In one possible configuration, the magnetic orientations 132, 133 of the magnetic particles in both of first layer 102 and second layer 103 are solely aligned in a plane formed by the x and y axes that is coplanar with the recording surfaces of the magnetic recording tape 100 and coincident to the center of tape substrate 101. In order to minimize print through or contact recording, the magnetic particles in first layer 102 on front side 112 and the magnetic particles in second layer 103 on the back side 113 of tape 100 are oriented at the time of manufacture in orientations 132 and 133 which are angularly displaced with respect to each other. The effects of print through and magnetic recordings are prevented by the angular displacement as discussed in the below description of FIGS. 4 and 5.

FIG. 2 illustrates a magnetic orientation 134 of the magnetic particles of the layer 102 along a z-axis in direction non-coplanar with the recording surface of the magnetic recording tape 100. Magnetic orientation 134 is orthogonal to magnetic orientation 133 which is in the x-y plane. It is obvious that, in a three dimensional Cartesian coordinate system, magnetization along any two axes within this three dimensional system, maximizes the angular displacement of the magnetic orientations. The maximum angular displacement minimizes the effects of contact recording and print through. It is also envisioned that any arbitrary pair of vectors may define the magnetic orientations of first layer 102 on front side 112 and second layer 103 on back side 113 of magnetic recording tape 100 as long as these two vectors are at a significant angle with respect to each other in three dimensions.

FIG. 3 illustrates the magnetic particles in first layer 102 oriented in orientation 134 at the time of manufacture and the magnetic particles in second layer 103 oriented in orientation 135 at time of manufacture. Orientation 134 is orientated along the z-axis in a first direction non-coplanar with the recording surface. Orientation 135 is oriented along the z-axis in a second direction non-coplanar with recording surface and angularly displaced from the first direction of orientation 134. The angular displacement between orientations 134 and 135 is significant enough to prevent print through and contact recording as discussed below in the descriptions of FIGS. 4 and 5.

Figure 4:
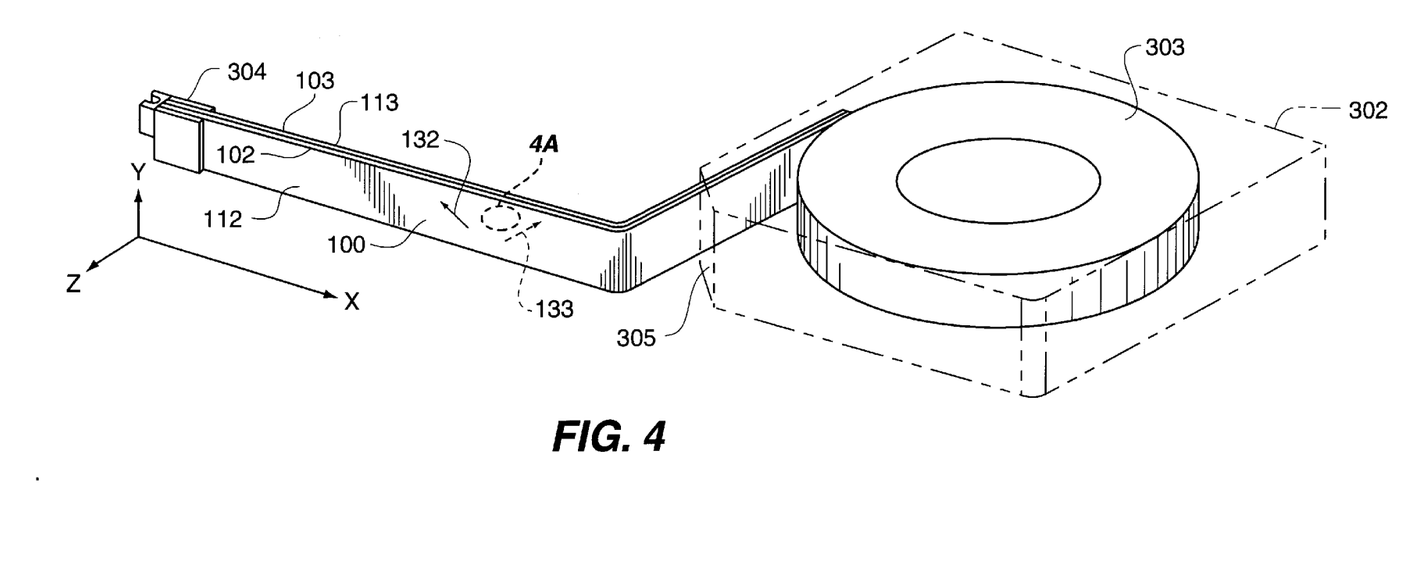
FIG. 4 illustrates the polarity of a cluster of magnetic particles on a recording surface of a magnetic tape prior to recording.
Figure 4A:
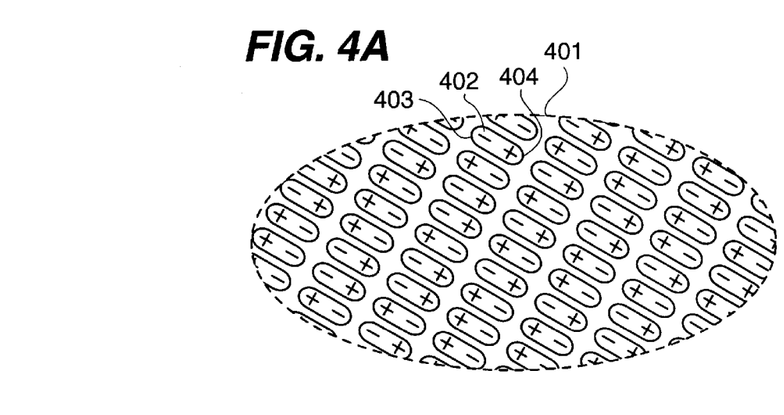

FIG. 4 illustrates tape 100 with magnetic particles of first layer 102 oriented in first orientation 132 at the time of manufacture and the magnetic particles of second layer 103 oriented in second orientation 133. FIG. 4A illustrates a magnified view of a cluster 401 of magnetic particles 402 from layer 102 show individual magnetic particles 402 in the magnetic particles. Each magnetic particle 402 in cluster 401 is oriented in direction 132. However, the polarity of each particle is random. The positive (+) and negative (−) or north and south pole of each particle is at either end 403 or 404 of the particle.

Figure 5:
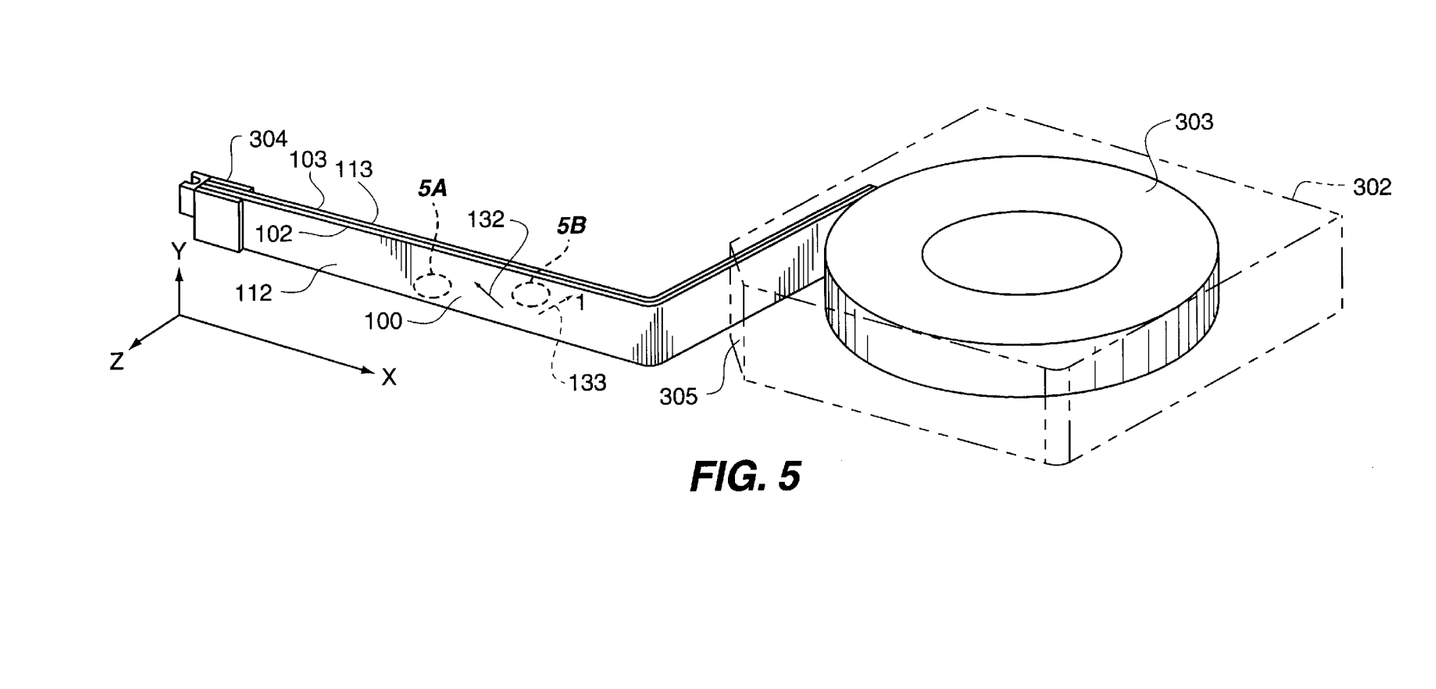
FIG. 5 illustrates the polarity of magnetic material after recording data on the recording surface.

FIG. 5 illustrates a magnetic tape 100 storing user data which has been recorded on the recording surface defined by first layer 102 subsequent to the manufacture if tape 500. During the recording process, binary 0's or 1's may be recorded on the recording surfaces defined by first layer 102 and second layer 103 of tape. Binary 0's are recorded by magnetizing a portion of the magnetic particles in first or second layer 102/103 to align the polarities of particles in the magnetic particles in a first uniform direction of magnetization. Binary 1's are recorded by magnetizing a portion of the magnetic particles to align the polarities in the magnetic particles in a second uniform direction of magnetization opposite the first uniform direction of magnetization for a binary 0.

Figure 5A:
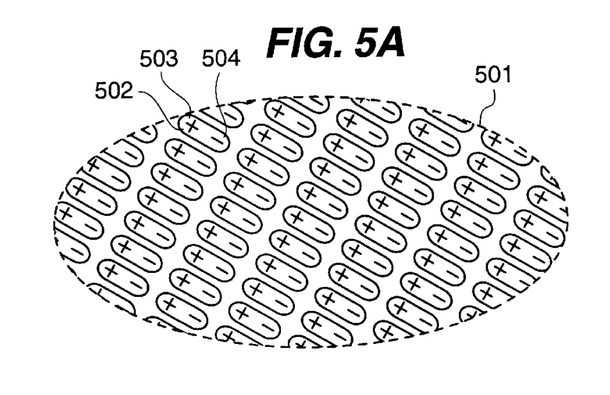
Figure 5B:
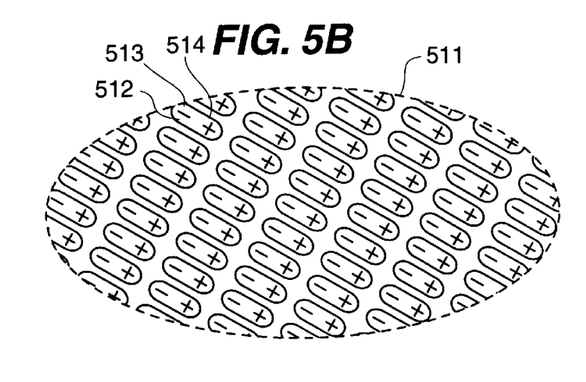

FIG. 5A illustrates a portion 501 of layer 102 that has been magnetized to represent a recorded binary 0. The magnetic particles 502 of portion 501 have been magnetized during the recording process to align the magnetic particles with the positive poles on end 503 of each magnetic particle 502 and the negative poles on end 504 of each magnetic particle 502 to represent a binary 0. FIG. 5B illustrates a portion 511 of layer 102 that has been magnetized to represent a recorded binary 1. The magnetic particles 512 of portion 511 have been magnetized to align the magnetic particles with the negative poles on end 513 of each magnetic particle 512 and the positive poles on end 514 of each magnetic particle 512 to represent a binary 1. Although the polarity of the magnetic particles maybe changed by the recording process, the orientation 132/133 of the magnetic particles remains the same and the magnetic particles of first layer 102 on first side 112 of tape 100 remains oriented in a direction angularly displaced from the orientation of magnetic particles in second layer 103 on second side 113 of tape 100. The angular displacement of the orientations of the magnetic particles reduces the effects of contact recording and print through.

In reading data from the recording surfaces of first layer 102 and second layer 103 of magnetic tape 100, the effects of print through and contact recording are minimal due to the angular displacement of the orientation of first layer 102 on first side 112 with respect to the orientation of second layer 103 on second side 113. The angular displacement between the orientations causes each of read/write heads 142–145 in FIGS. 6 and 7 to be relatively insensitive to errant magnetization in the other orientation as data is written on the side of magnetic tape 100 that is opposite read/write head 142–145. The insensitivity is due to the angular displacement of read/write heads 142–145 on one side of a tape 100, such as first side 112 of magnetic tape 100, and the orientation of the magnetic particles on an opposite side of tape 100, such as second side 113 of tape 100.

Magnetic Domain Misalignment and Read/Write Head Separation

As noted above, the possibility of magnetic print through or contact recording is reduced by increasing the angular disparity between orientations of the magnetic particles in layers 102, 103 on both sides 112,113 of the magnetic tape 100. This is due to the fact that the read/write heads 142–145 are oriented in an azimuth angle to match the desired magnetic orientation of magnetic particles storing data on magnetic tape 100. Any errant magnetization due to print through or contact recording would be at a significant angular displacement from the azimuth angle of the read/write heads 142–145 and therefore attenuated by this angular displacement.

$$\text{Attenuation factor} = \frac{\sin\left(\frac{\pi w \tan \alpha}{\lambda}\right)}{\left(\frac{\pi w \tan \alpha}{\lambda}\right)}$$

where:
w=track width
λ=wavelength of recorded data
∝=misalignment of azimuth angle Increased angular displacement of the read heads 142, 144 from the recorded magnetization produces diminished magnitude read signals.

In similar fashion, the effects of layer thickness can be precisely determined. As the thickness of tape increases, the separation between the read/write heads 142, 143/144, 145 on one side and the region of magnetization of the magnetic materials in layer 102/103 on the opposite side 112/113 of magnetic tape 100 increases. This relationship can be expressed as:

$$\text{Attenuation factor} = e^{-2\,\pi T/\lambda}$$

where
T=separation (tape thickness)
λ=wavelength of recorded data

Thus, an increase in the layer thickness and/or the angular displacement between read/write heads and magnetic orientations on the other side of magnetic tape 100 results in a reduction of the effects of print through and contact recording phenomena.

Tape Drive Apparatus

Figure 6:
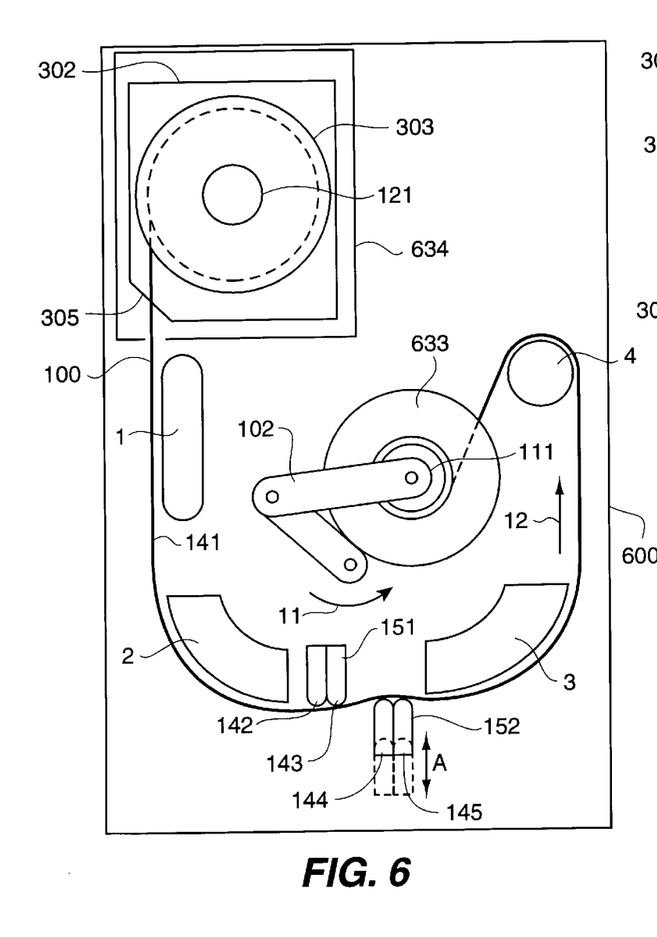
FIGS. 6 and 7 illustrate a drive mechanism having two read/write heads.

FIG. 6 illustrates the mechanical configuration of a tape drive apparatus 300 that can be used to read and write data on two sided magnetic recording tape 100. The apparatus illustrated in FIG. 6 is similar to a 3480-type form factor magnetic tape drive apparatus. A tape elevator (not shown) or cartridge slot 634 is used to accept the 3480-type magnetic tape cartridge 302. A tape threading arm 102 is used to grasp the leader block 304 from the tape cartridge 302 and thread the leader block 304 and the magnetic tape 100 attached thereto along tape threading path 141 to takeup reel 333. A plurality of guides 1–4 are used along tape path 141 to guide the positioning of the magnetic tape 100 along tape path 141. The tape threading arm 102 rotates in the direction indicated by arrow 11 and the magnetic tape 100 is threaded along tape threading path 141 in the direction indicated by arrow 12.

Along tape threading path 141 and between guides 2 and 3 are located two sets of read/write heads 151/152, comprising a read head 143 and write head 142 for the first set of read/write heads 151 and read head 145 and write head 144 for the second set of read/write heads 152. The two sets read/write heads 151, 152 may be comprised of substantially identical read/write elements and use substantially the same recording channels for read/write operations. The difference between first set of read/write heads 151 and second set of read/write heads 152 being the azimuth alignment of each set for reading/writing data to and from tape 100.

The sets of read/write heads 151/152 are positioned on opposite sides of the tape threading path 141 and located substantially adjacent to each other in the preferred embodiment in order to concurrently read and write data on to both sides 112, 113 of the magnetic recording tape 100. A takeup reel motor 111 is used to drive takeup reel 633 and a supply reel motor 121 is used to drive the reel 303 contained in the magnetic tape cartridge 302 that is inserted into tape slot 633.

In order to permit tape threading arm 102 to transport leader block 304 along tape threading path 141 between the first set of read/write heads 151 and the second set of read/write heads 152, one of the two sets of read/write heads 151, 152 can be moveable to permit leader block 304 to pass. Tape drive 600 illustrates a possible configuration where the second set of read/write heads 152 is moveable in direction A between a first position (illustrated in dotted line form) and a second position (illustrated in solid line form). When second set of read/write heads 142 is in the first position, leader block 304 is able to pass along tape threading path 141 between second set of read/write heads 152 and tape guide 3 during the tape threading operation. When second set of read/write heads is in a second position magnetic tape 100 is in contact with the second set of read/write heads 152 for data read/write operations.

It should be noted that although simultaneous use of the two sets of read/write heads 151, 152 is described, the sequential use of the two sets of read/write heads 151,152 is possible by either simply rewinding magnetic tape 100 into magnetic tape cartridge 302 once data is written in a first direction on one side of magnetic tape 100 and then writing data in the same direction on the other side of magnetic tape 100 or by writing data on the other side of magnetic tape 100 in the opposite direction once the end of magnetic tape 100 is reached.

Alternate Tape Drive Apparatus

Figure 7:
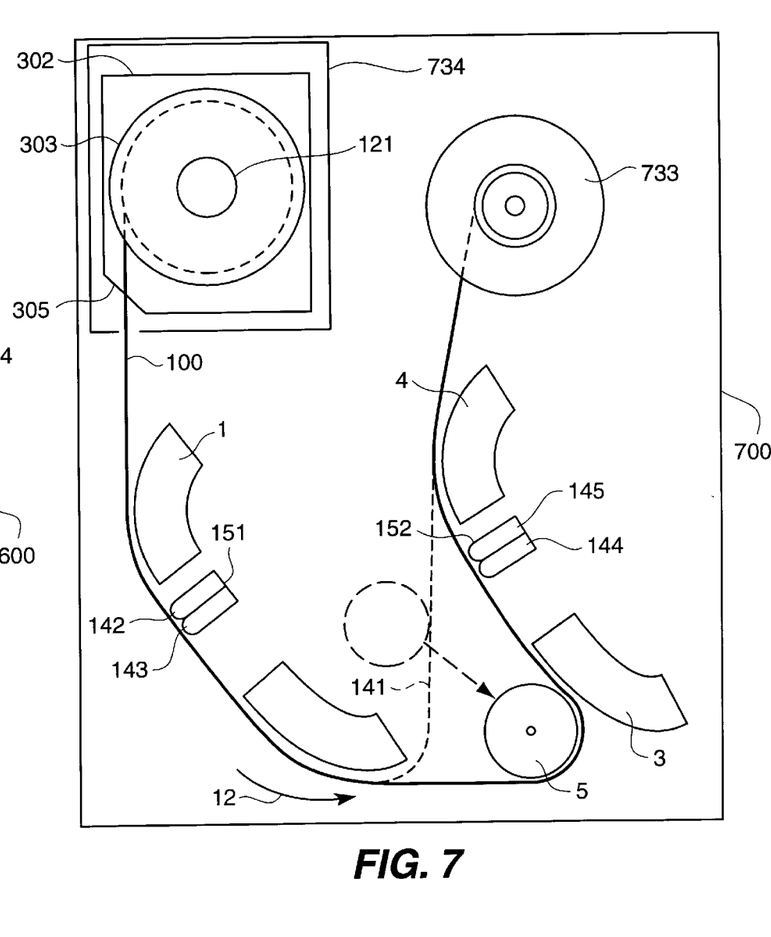

There are many possible configurations of read/write heads 142–145 possible in a tape drive to simultaneously read/write data on both sides 112, 113 of a two sided magnetic tape 100. FIG. 7 illustrates an alternative configuration to that shown in FIG. 6. In particular, tape drive 600 uses a moveable set of read/write heads 152 while tape drive 700 has two fixed sets of read/write heads 151, 152. Tape drive 700 makes use of a moveable tape guide 5 to relocate magnetic tape 100 between tape threading path 141 and the tape read/write position against tape guide 3 and second set of read/write heads 152. Tape guide 5 is placed in a first position (illustrated in dotted line form) to enable leader block 304 and the attached magnetic tape 100 to traverse tape threading path 141 over tape guides 2, 5, 4 and into takeup reel 433. However, in this location, magnetic tape 100 does not contact the second set of read/write heads 152 or tape guide 3. When the magnetic tape 100 is threaded through tape threading path 141, tape guide 5 moves into a second position (illustrated in solid line form). When in the second position, tape guide 5 guides magnetic tape 100 into contact with tape guide 3 and the second set of read/write heads 152.

It is anticipated that numerous alternative embodiments of tape drives can be produced that use either moveable read/write heads or moveable tape guides or both. The tape drives 600, 700 illustrated in FIGS. 6 and 7 are simply illustrative of the concepts of the invention and are not intended to limit the scope of the appended claims.

Head Alignment

Figure 8:
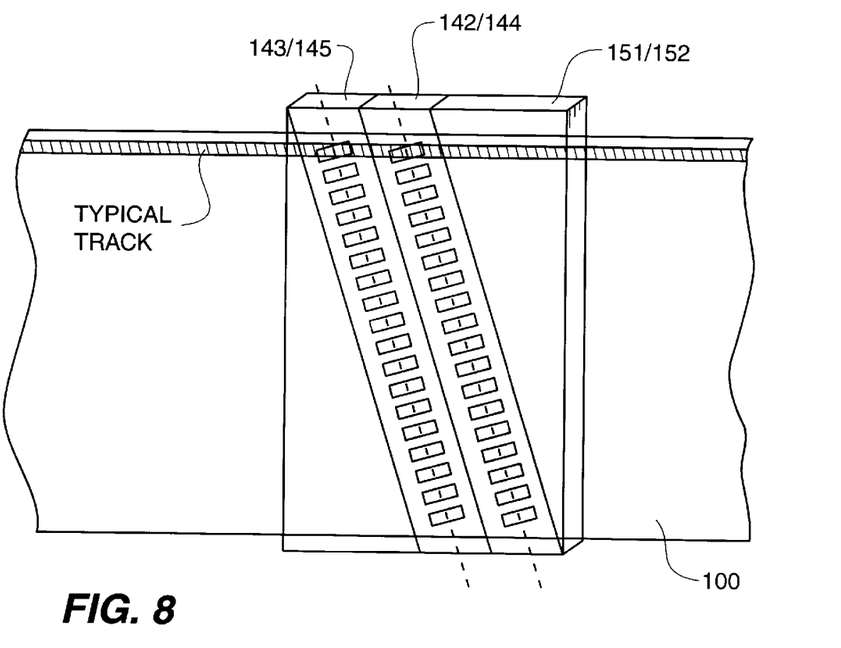
FIGS. 8 and 9 illustrate the azimuth orientation of the recording heads in the dual head tape drive.
Figure 9:
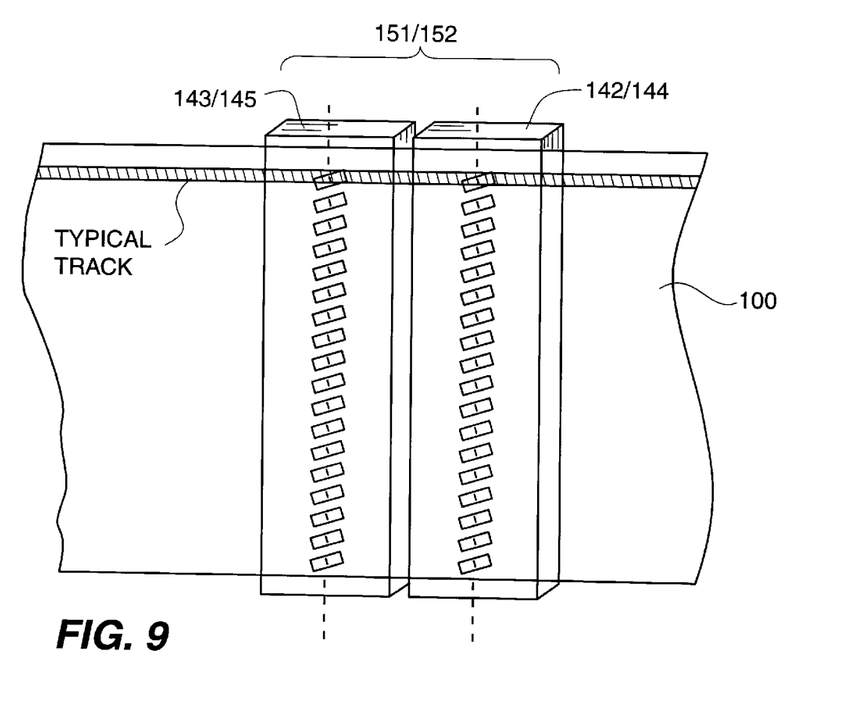

FIGS. 8 and 9 illustrate two configurations of the read/write heads 142–145 in order to indicate the alignment relationship therebetween and the azimuth alignment with magnetic tape 100. In order to maintain a substantial angular relationship between the data recorded on the first 112 and second 113 sides of the magnetic recording tape 100, the individual elements in the multitrack read/write head 142–145 for each of the two sets of read/write heads 151, 152, are arranged to align with the respective magnetic orientation 132, 133 of the first 102 and second 103 layers of magnetic particles of magnetic recording tape 100. Thus, the read/write elements in read/write heads 142, 143 are aligned to correspond to the magnetic orientation of the magnetic particles in layer 103 on the second side 113 of the magnetic recording tape. The read/write elements of the read/write heads 144,145 are similarly aligned to correspond to the magnetic orientation of the layer 102 of magnetic particles on the first side 112 of the magnetic recording tape 100.

Each of read/write heads 142–145 consist of a stack of read/write elements. For an 18-track magnetic tape, read heads 143,145 include 18 read elements that are spaced apart at regular intervals to span the width of magnetic tape 100. Similarly, write heads 142, 144 comprise 18 write elements that are spaced apart to match the spacing of the read elements in read heads 143, 145 so that each read element has a corresponding write element, both of which define a track of data on magnetic tape 100. The stack of read and write elements that comprise read heads 143,145 and write heads 142,144 can be stacked one directly above the next as shown in FIG. 8 or the entire stack can be skewed as shown in FIG. 9. In either of these approaches, the read and write elements can be integrated into a single head structure, as in FIG. 8, or utilized in separate head structures, as in FIG. 9. As an additional alternative, the read/write heads 142–145 can be configured from stacks of alternating read and write elements.

While specific embodiments of this invention have been disclosed, it is expected that those skilled in the art can and will design alternate embodiments of this invention that fall within the scope of the appended claims.

We claim:

1. A two-sided magnetic recording tape having an improved resistance to contact recording and print through, comprising:

a tape substrate having a first side and a second side;

a first magnetic recording surface on said first side consisting of a single layer of magnetic material which includes particles substantially all of which are oriented in a first non-random direction during the manufacture of said magnetic recording tape;

a second magnetic recording surface on said second side consisting of a single layer of said magnetic material which includes particles substantially all of which are oriented in a second non-random direction during the manufacture of said magnetic recording tape;

said orientation of said magnetic particles in said first magnetic recording surface defining a first magnetic domain having said first direction;

said orientation of said magnetic particles in said second magnetic recording surface defining a second magnetic domain having said second direction that is angularly displaced with respect to said first direction of said first magnetic domain to reduce the effects of contact recording and print through during subsequent use of said magnetic recording tape.

2. The two-sided magnetic recording tape of claim 1 wherein:

said first magnetic domain of said first magnetic recording surface is oriented along a first vector in said first direction coplanar with a plane that is coplanar with said first magnetic recording surface and coincident to said tape substrate; and said second magnetic domain of said second magnetic recording surface is oriented along a second vector in said second direction angularly displaced from said first direction coplanar with a plane that is coplanar with said second magnetic recording surface and coincident to said tape substrate.

3. The two-sided magnetic recording tape of claim 2 wherein said first vector and said second vector are symmetric to said plane coplanar with said first and said second magnetic recording surfaces and coincident to said tape substrate.

4. The two-sided magnetic recording tape of claim 2 wherein said first and second vectors are substantially orthogonal to each other.

5. The two-sided magnetic recording tape of claim 1 wherein:

said first magnetic domain of said first magnetic recording surface is oriented along a first vector in said first direction coplanar with a plane that is coplanar said first magnetic recording surface and coincident to said tape substrate; and said second magnetic domain of said second magnetic recording surface is oriented along a second vector in said second direction angularly displaced from said first direction non-coplanar with a plane that is coplanar with said second magnetic recording surface and coincident to said tape substrate.

6. The two-sided magnetic recording tape of claim 5 wherein said first and second vectors are substantially orthogonal to each other.

7. The two-sided magnetic recording tape of claim 1 wherein:

said first magnetic domain of said first magnetic recording surface is oriented along a first vector in said first direction non-coplanar with a plane that is coplanar with said first magnetic recording surface and coincident to said tape substrate; and said second magnetic domain of said second magnetic recording surface is oriented along a second vector in said second direction angularly displaced from said first direction and non-coplanar with a plane that is coplanar to said second magnetic recording surface and coincident to said tape substrate.

8. The two-sided magnetic recording tape of claim 7 wherein said first vector and said second vector are symmetric to a plane coplanar with said first and said second magnetic recording surfaces and coincident to said tape substrate.

9. The two-sided magnetic recording tape of claim 7 wherein said first and second vectors are substantially orthogonal to each other.

10. The two-sided magnetic recording tape of claim 1 wherein said magnetic particles on said first side and said magnetic particles on said second side have substantially identical bulk magnetic propertie produced by using substantially identical processes.

11. The two-sided magnetic recording tape of claim 1 further comprising:

user data recorded on said first magnetic recording surface subsequent to manufacture of said tape characterized by a portion of said magnetic particles of said first magnetic recording surface having polarities in a first uniform direction of magnetization and being oriented in said first direction of orientation; and user data recorded on said second magnetic recording surface subsequent to manufacture of said tape characterized by a portion of said magnetic particles on said second magnetic recording surface having polarities in a second uniform direction of magnetization and being oriented in said second direction of orientation angularly displaced from said first direction of orientation of said user data recorded on said first magnetic recording surface.

12. The two-sided magnetic recording tape of claim 11 wherein said user recorded data on said first side and said user recorded data on said second side are recorded on said first and said second magnetic recording surfaces using substantially identical read/write head and substantially identical recording channels.

13. A method for recording user data on a two-sided magnetic tape having a first magnetic recording surface on a first side of said magnetic tape consisting of a single layer of magnetic material which includes particles oriented in a first non-random direction during the manufacture of said magnetic tape and a second recording surface on a second side of said magnetic tape consisting of a single layer of magnetic particles oriented in a second non-random direction during the manufacture of said magnetic tape, said method comprising the steps of:

applying a first magnetic field to said magnetic particles in said first magnetic recording surface to polarize a portion of said magnetic particles in a first uniform direction of magnetization with said portion of magnetic particles oriented in said first direction to reduce the effects of contact recording in print through from said second magnetic recording surface; and applying a second magnetic field to said magnetic particles in said second magnetic recording surface to polarize a portion of said magnetic particles in a second uniform direction of magnetization with said portion of magnetic particles being oriented in said second direction of orientation angularly displaced from said first direction of orientation to reduce the effects of contact recording and print through from said first magnetic recording surface.

* * * * *